Patented July 19, 1932

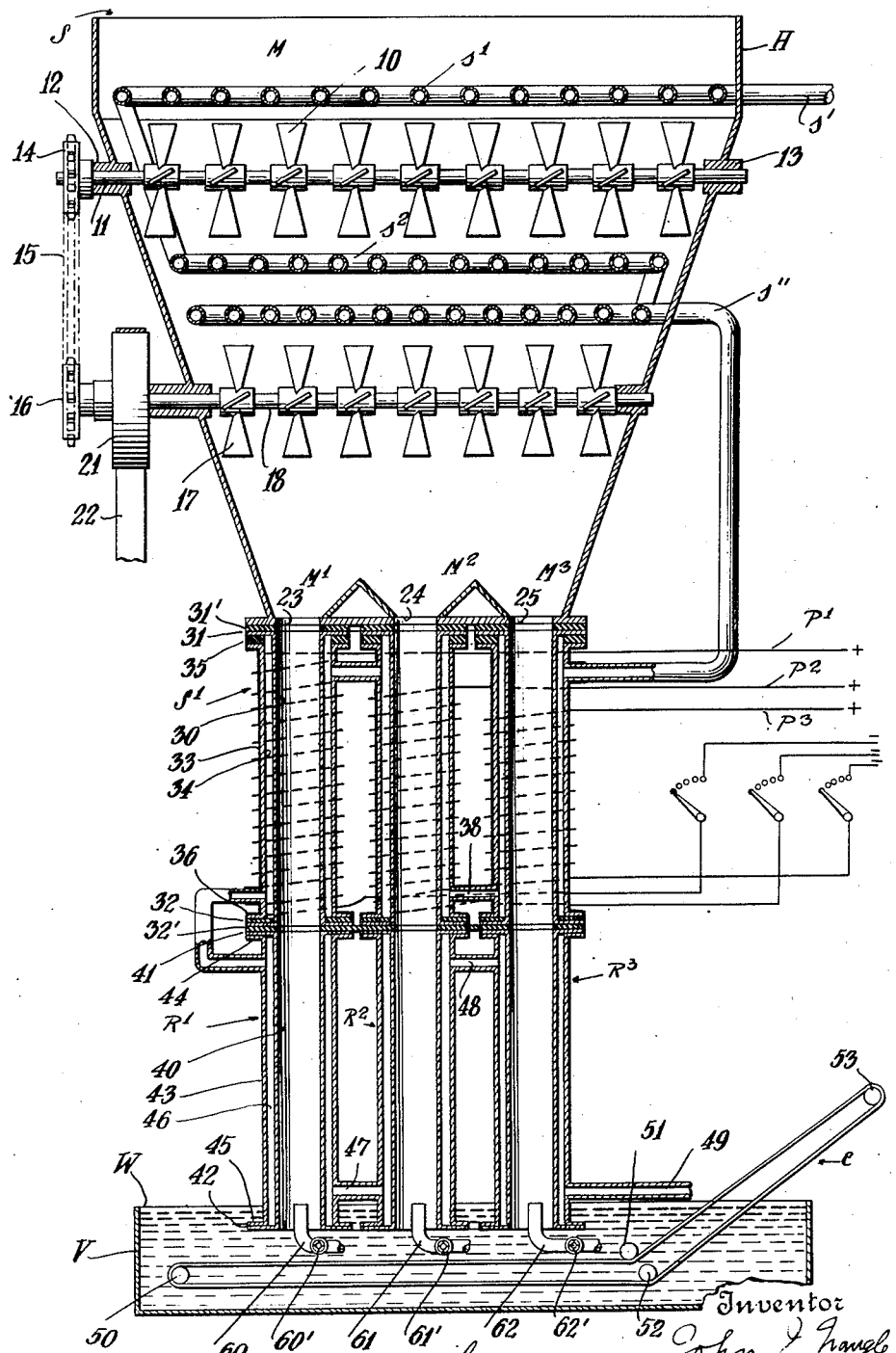

1,867,750

UNITED STATES PATENT OFFICE

JOHN J. NAUGLE, OF RYE, NEW YORK

APPARATUS FOR HEATING AND TREATING SUBDIVIDED CARBONACEOUS MATERIAL AND THE LIKE

Original application filed January 19, 1926, Serial No. 82,378. Divided and this application filed June 14, 1927. Serial No. 198,742.

My present invention relates to apparatus for activating carbonaceous material, such as carbonized lignin residues, and the like, and for revivifying spent decolorizing carbon, especially decolorizing carbon derived from carbonized lignin residues, and aims to devise apparatus of the general character designated which are simple and convenient to operate, which result in many economies in the art in which the same are intended to be employed, and which possess other advantages in part pointed out in detail hereinafter and in part obvious to those skilled in the art to which the present invention relates.

In the accompanying specification I shall describe, and in the annexed drawing show, an illustrative embodiment of the apparatus of the present invention. It is, however, to be clearly understood that my invention is not limited to the specific embodiment thereof herein described for purposes of illustration only. The present application is a division of my previously filed application, Serial No. 82,378, filed January 19, 1926, and entitled "Method and means for preparing activated carbons".

Before describing the aforesaid illustrative embodiment of the apparatus of the present invention, it may be desirable briefly to describe one form of method which may be successfully practiced with the apparatus of the present invention. In practicing such method, I prefer to use as the raw material on which the aforesaid illustrative embodiment of the method is to operate a carbonaceous material, such as material known as leached carbonized lignin residues or carbonized leacher refuse. This material, while it may be obtained from various sources, is preferably obtained by carbonizing the lignin liquors derived from the manufacture of wood pulp by the alkali (soda) process, although analogous materials suitable for treatment according to the method of the present invention and in the apparatus of the present invention may be obtained from other sources. Limiting the description, for purposes of example merely, to the specific materials mentioned, namely the leached carbonaceous lignin residues referred to, such residues are obtained by carbonizing in retorts, with little or no access of air or other source of oxygen, or with carefully restricted access of air or other source of oxygen, the lignin liquors derived by removing wood pulp obtained by treating woods rich in resins, such as spruce, hemlock and jack or other pines, with a caustic alkali, such as caustic soda.

The granular carbonized mass thus obtained contains a suitable quantity of alkaline substances, generally in the form of carbonates, especially sodium carbonate, where caustic soda has been used for the preparation of the wood pulp. The carbonized mass thus obtained is therefore leached with water to remove most of the soluble mineral substances, particularly the sodium or other alkaline carbonate present in the pores of the material. The purpose of this step is to remove as much as possible of the water-soluble mineral substances present in the carbonized mass, after which the leached material may be given an acid wash, as with a weak solution of hydrochloric acid, preferably a one per cent solution of hydrochloric acid, to further remove acid-soluble mineral substances and to neutralize and remove the alkaline substances present in the carbonized mass, particularly the alkaline carbonates, such as sodium carbonate, present in such mass.

There thus results a material containing about 5 per cent of ash in the dry state as compared with an ash content of from about 7 to about 10 per cent. present in the leached material in the dry state before the same has been given the acid treatment referred to above.

It may here be stated that where the method is utilized for revivifying spent carbon, instead of manufacturing fresh activated carbon from raw material, the method has particularly successful application in connection with the revivification of spent carbon derived from carbonized lignin residues as described above, especially where such carbons have been spent in the purification of saccharine fluids. Among such saccharine fluids are raw sugar melts, affinations, syrups and molasses, in connection with which the newly derived as well as the revivified carbons prepared in accordance with the method of the present invention may be very successfully employed.

The water and acid-leached carbonized lignin residues obtained as above described and now containing only about 5 per cent. of ash in the dry state, but containing about 70 per cent. moisture, are now suitably dried. I prefer that the moist residues shall be dried by steam coils, the steam for which is preferably obtained by waste heat values derived from a later stage of the process. For this purpose the leached material may be fed past a series of steam coils through which steam passes which has been generated by waste heat values from a later stage of the process. The heating for drying purposes preferably takes place at a temperature of about 100° C.

The dry material is now preferably passed through the hollow secondaries of an induction couple or couples in which current is induced, which in turn induces current in the mass of leached and dried lignin residues, which latter are heated to a point at which they become readily conductive, thus permitting an induced current of suitable strength to be generated in the mass of the leached and dried carbonized lignin residues. For this purpose, the mass of the leached and dried carbonized lignin residues should be preheated to a temperature of about 300° C. At this temperature the carbon begins to be substantially more conductive than at normal temperature.

Thereupon an induced current of suitable strength begins to be built up in the mass of leached and dried carbonized lignin residues now heated to a temperature at which they are rendered substantially conductive. The induced current is continued to be generated in the mass of the leached and dried carbonized lignin residues until a temperature of from about 800 to about 950° C. is generated in the mass being treated. At this point air, or steam, which steam is preferably generated by waste heat values derived from the heat generated by the current induced in the mass of material being treated, is admitted to the charge of material in the hollow secondaries. I prefer that the air, or steam, or both of these agencies, shall be added in controlled amounts so as to burn away the finer particles characterized by a lower degree of activation, this burning away being due to the presence of a controlled amount of air admitted to the charge, and that enough steam should be added to maintain the material in a more or less open or porous condition, which likewise increases the degree of activation of the final product.

The material should be subjected long enough to the induced current, which should be of such intensity that a mass is finally obtained which is very open or porous and which contains only a very small amount of denser, finer particles of carbon. In this condition the mass is in a more or less semi-graphitic condition, being harder than amorphous carbon and having a point of ignition several hundred degrees higher than amorphous carbon, such as the carbon derived by the graphitization of sugar or sugar residues at comparatively low temperatures, but being much more combustible than graphite and being likewise not as hard as graphite, which is of little or no value for decolorizing purposes.

The material is subjected to the action of the induced current for about from 15 to about 60 minutes, generally for about 30 minutes. The time of treatment depends upon the mechanical strength, porosity and carbon content of the material, as shown by suitable tests made from time to time to indicate the progress of the process. The loss during the calcination step is anywhere from about 20 to about 30 per cent. of the weight of the original material in its dry condition. Due to the considerable combustion which takes place at this stage of the process, the ash content of the material will be found to have increased considerably, being now about twice the ash content of the original leached and dried carbonized lignin residues, that is, about 10 per cent. of the weight of the material in the dry condition, where its original ash content in such condition was about 5 per cent. The great part of the mineral content of the treated material will, however, be found to be in the condition of comparatively heavy clinkers containing a great part of the ash content, from which clinkers the lighter and more highly activated material may subsequently be separated by any suitable means, as by flotation in a blast of air, or of steam, or of both, or by flotation in water or acidified water.

Where, as is preferred, the ash content of the leached and dried residues is about 5 per cent., or even less, the single stage of heating to the point of semi-graphitization, combined with the subsequent acid wash hereinafter described in considerable detail, will often be sufficient without other treatment to yield a highly activated carbon having an ash content of three per cent. or even less, as 2½ per cent., or lower still, based on the weight of the material in the dry condition.

However, if the ash content of the leached, dried material, before being subjected to the action of the induced current, is substantially in excess of 5 per cent., based on the weight of the material in the dry condition, or where a particularly pure carbon is desired to be obtained, the treated material may be subjected to a further treatment in the hollow secondaries where it will be subjected to the action of an induced current of substantial intensity, the second treatment being, however, preferably at a lower temperature, as at a temperature of from about 350 to about 450° C.

This secondary treatment at a lower temperature may be continued for from about 15 to about 60 minutes, generally for about 30 minutes, being about the same length of time as the original treatment under the action of the induced current. As in the case of the earlier treatment, the time of the treatment depends upon the mechanical strength, porosity and carbon content of the pretreated material, as may readily be determined by suitable tests made from time to time to indicate the progress of the treatment. The loss during this step of the process will be about 5 per cent. of the weight of the pretreated material in its dry condition. Due to the negligible combustion which takes place at this stage of the process, the ash content of the treated material will be found to have increased only very slightly. A substantial part of the mineral content of the treated material will, however, be found to be in the condition of relatively heavy but moderately sized clinkers containing a great part of the ash content of the now twice treated material, from which clinkers a lighter and more highly activated carbon may subsequently be separated by any suitable method, as by flotation in a blast of air, or of steam, or of both, or by flotation in water or acidified water. It may here also be stated that during the time of its treatment in the hollow secondaries, the pretreated material may, as in the case of the initial treatment, be subjected to the action of air, or of steam, or of carbon dioxide, or of any combination of two or more of these or other activating reagents.

The material coming from the furnace, either after the second treatment or immediately after the first treatment in the induction furnace, assuming in the latter case that a single treatment is sufficient for the purposes of the present invention, is now permitted to become cooled, preferably in the absence of air, so as to prevent its combustion. Or else, it may be quenched by being dropped into water or acidified water. In fact, one way of obtaining the most highly activated portion of the finally treated material would be to drop the hot mass coming from the furnace, either after the second treatment of or after the single first treatment, into a receiving tank of water or acidified water, preferably acidified water acidified with from about one-half to about one per cent. of hydrochloric acid.

By now vigorously stirring the mass of the material in the acidified water, the lighter and more active portions may be decanted from the heavier and less active portions, or separated therefrom in any other suitable manner, after which the suspension may be sent to suitable filters where the activated carbon may be separated from the liquid medium in which it is suspended. Under conditions, it may be desirable to leave the carbon on the frames of the filter press or equivalent device, in which it has been separated from the liquid suspending medium surrounding the same, and while the carbon is still on the filter frames to pass through the same under any desired degree of pressure any desired purifying liquids or reagents to further improve the quality of the carbon and to increase its degree of activation, as by sending through the carbon on the frames first a dilute solution of hydrochloric acid to further remove traces of water soluble and acid soluble impurities, especially of a mineral character, after which pure wash waters may be forced under pressure through the carbon forming a layer on the frames of the filter press or the like.

The resulting carbon, whether made directly from leached carbonized lignin residues in the formation of fresh or virgin carbon, or whether in the form of revivified carbon prepared from spent carbon, such as carbon derived from leached carbonized lignin residues and spent in the purification of saccharine fluids, such as sugar melts, affinations or other run-offs, syrup and molasses, will be found to be low in ash content containing often as little as 3 per cent., or even as low as two and one-half per cent., or sometimes less still, its weight of ash in the dried condition. The resulting product will be found to be remarkably active, being characterized by its high rate of filtration and remarkable decolorizing properties. Its point of ignition is about 650° F., which indicates that it is in a semi-graphitized or semi-graphitic condition, being a point of ignition about 200° F. higher than the point of ignition of ordinary amorphous carbon, such as carbonized sugar or the secondary carbon comprising the carbonized impurities picked up by decolorizing carbon in the purification of saccharine fluids, such as the fluids specified above, which latter point of ignition is about 450° F.

These properties of the activated carbons of the present invention are of great importance, since they permit the carbon to be revivified as already described above by reason of this substantial difference in the points of ignition between the decolorizing carbon and the carbonized impurities which it picks up from the saccharine fluids, or the like, which it has been used to purify. For a decolorizing carbon to be effectively revivified, it is necessary that its point of ignition be substantially higher than the point of ignition of the carbonized impurities of "secondary" carbons resulting from the carbonization of the impurities picked up during the use of the decolorizing carbon.

These conditions are admirably satisfied by the products resulting from the practice of the aforesaid method and the use of the apparatus of the present invention. The decolorizing carbons of the present invention will be found to have the secondary carbons resulting from carbonizing the impurities picked up from the saccharine or other fluids with which the decolorizing carbons of the present invention have been used, in their surface, as well as inside the pores of the particles. In any event, these secondary carbons will appear to cover the interior as well as the exterior surfaces of the porous carbon particles and will, therefore, be the first to go, since the comparatively low temperature required for their ignition is first and readily reached. Furthermore, the combustion of these secondary carbons serves to supply some of the necessary heat for the cleaning out or scavenging of the particles of decolorizing carbon and thus economizes the heat values that must be supplied by the electrical current for the revivification step.

It may here be stated that where the process is merely one of revivification of spent decolorizing carbon made in accordance with the principles of the present invention, it would ordinarily be necessary to subject the spent carbon only to a single heating step analogous to the second heating step described above in connection with the preparation of fresh or virgin carbon. That is, the spent carbon, in order to be revivified in accordance with the principles of the present invention, would be heated in a single step at a temperature of from about 350 to about 450° C., which would be sufficient to consume the secondary carbons and the undesirable fines which would ordinarily have been produced by the partial breaking down mechanically of some of the activated carbon during its use, thus serving to open up once more the particles of activated carbon and to yield a revivified carbon equal, in most cases, and in some cases slightly superior in degree of activation, to the original fresh or virgin carbon.

In this case, also, the heated mass of treated carbon, coming from the hollow secondaries of the induction furnace, may be cooled in any suitable manner, as by bringing the heated mass of revivified carbon into a tank of water, or acidified water, preferably the latter in the form of a weak solution of hydrochloric acid. Here the suspended mass of revivified carbon may be vigorously stirred in the presence of acidified water to thus further reduce its ash or mineral content and to separate it from the heavier, more fully mineralized particles of lesser degrees of activation, after which the lighter particles may be separated by decantation or otherwise in their suspending fluid and sent to a filter press or other device, where they may be further treated with acidulated and pure wash waters successively and finally removed from the filter frames and dried for subsequent use. It may here be stated that this final drying step is desirable also in the case of the original fresh or virgin carbon when it has been removed from the filter frames or the like apparatus.

Referring now to the aforesaid illustrative embodiment of the apparatus of the present invention, and more particularly to the drawing illustrating the same, S indicates a source of supply of carbonaceous material, such as the leached carbonized lignin residues referred to earlier in this specification. I provide suitable means for receiving the carbonaceous material and also for feeding the same into the treating zone of the apparatus. Such means may comprise a hopper H receiving the carbonaceous material M and being suitably shaped to feed the material preferably in a downward direction into the heating zone. In order to effect the proper movement and feeding of the material M into the treating zone of the apparatus, I may provide any suitable feeding means, such, for example, as the paddles or stirrers 10 of which a series is mounted on the shaft 11 carried in the bearings 12 and 13 mounted on the hopper H, the shaft 11 carrying the pulley 14 keyed thereto, driven by a suitable belt 15 from a power pulley 16, itself driven as hereinafter fully set forth.

A second set of paddles or stirrers 17 may be provided mounted on the power shaft 18 likewise carried by the bearings 19 and 20 supported on the hopper H and driven by the power pulley 16 directly keyed to the power shaft 18. The power shaft 18 may be driven by a pulley 21 mounted thereon, by a suitable belt 22 moved by itself driven by any suitable source of power not deemed necessary here to be shown. The direction of rotation of the paddles or stirrers 10 and 17 and their construction are such that the material M will be fed at the desired rate of speed downwardly into the treating zone of the apparatus. For this purpose, the rate of speed of rotation of the paddles or stirrers 10 and 17 may be regulated and controlled by regulating and controlling the speed of rotation of the pulleys 14, 16 and 21 in accordance with the characteristics of the material M being treated in the apparatus. It may here be stated that the material M initially admitted to the apparatus may comprise acid-leached carbonized lignin residues having an ash content of about 5 per cent., as above described.

I provide the apparatus with means for drying the carbonaceous material entering the apparatus, should such material, as is generally the case, be in a moist condition. For this purpose, I may provide the steam coil $s_1$ which is preferably supplied with waste steam from another part of the apparatus, as will be fully set forth later in this specification. The steam coil $s_1$ is disposed in a way which will most effectively utilize its heat values for the initial drying of the material M as it enters the apparatus for its subsequent treatment. The exhaust $s'$ from the steam coil $s_1$ may be exhausted into the air or sent to a condenser.

I also provide means in the form of another steam coil $s_2$, preferably communicating with the steam coil $s_1$ and preferably, also, provided with steam from the same source of supply, for giving the dried carbonaceous material M a slight preheating treatment to prepare it for the subsequent main preheating treatment which is to raise the temperature of the dried carbonaceous mass to such a point that the desired current may be readily induced in it. It may here be stated that the carbonaceous materials suited for treatment in accordance with the method and in the apparatus of the present invention generally have a negative temperature coefficient of resistance, with the result that the ohmic resistance of such materials diminishes as their temperatures increase, which makes it desirable to preheat such materials before they enter, or shortly after they enter, the hollow secondary or secondaries for the heat treatment in accordance with the principles of the present invention.

The inlet $s''$ for the steam entering the steam coil $s_2$ and thus finally entering the steam coil $s_1$ communicates with the steam jacket or jackets surrounding the hollow secondaries, as will now be described in considerable detail. The material M, now dried and preferably also slightly preheated, is moved by the blades or paddles 10 and 17 so as to enter the hollow secondaries, of which three have been shown herein by way of example merely. For this purpose, the lower portions of the hopper H is provided with the outlets 23, 24 and 25 which receive the respective fractions of the material M, here designated by reference characters $M_1$, $M_2$ and $M_3$. The outlets 23, 24 and 25 communicate with the respective hollow secondaries $S_1$, $S_2$ and $S_3$ which will now be described in detail herein.

Each of the secondaries, the three secondaries being preferably identical, so that only one of them need be described in detail herein, such as the secondary $S_1$, consists of a hollow tube of nichrome or similar heat-resisting and refractory material 30 provided with the flanged ends 31 and 32 which are suitably insulated, as by the pieces of insulating material 31' and 32', from the remaining portions of the apparatus. Surrounding the inner tube 30 of each hollow secondary is an outer tube 33 providing, in combination with the inner tube 30, a steam jacket 34. The outer tube 33 may likewise be formed of nichrome or some other heat-resisting and refractory material and may likewise be flanged at its upper and lower portions for cooperation with flanges 31 and 32 of the inner tube 30, as indicated by reference characters 35 and 36, respectively.

The three steam jackets surrounding the inner tubes 30 of the hollow secondaries $S_1$, $S_2$, and $S_3$, are connected in what may be termed a zigzag manner by having the upper ends, for example, of the steam jackets 34 of the hollow secondaries $S_1$ and $S_2$ connected by the tube 37, while the lower ends of the steam jackets 34 of the hollow secondaries $S_2$ and $S_3$ are connected by the tube 38, the upper end of the steam jacket of the hollow secondary $S_3$ communicating by means of a pipe 39 with the inlet $s''$ communicating with the steam coil $s_2$, and thus with the steam coil $s_1$.

The induction furnace comprises combined means for preheating the mass of carbonaceous material M up to the desired temperature, so that its resistance will be sufficiently reduced to enable it to have a substantial current induced therein for the heating operation, and also, in a lower or later part of the furnace, to conduct such heating operation at the desired temperature. For this purpose, the hollow secondaries $S_1$, $S_2$ and $S_3$ are surrounded by their respective primaries $P_1$, $P_2$ and $P_3$ in the form of coils of wire which are suitably insulated from each other and from their respective secondaries, as well as from other portions of the apparatus, and which are supplied with alternating current of the desired intensity and frequency from any suitable source of power, not here deemed necessary to be shown.

The intensity of the current supplied to the primaries $P_1$, $P_2$ and $P_3$, and thus to the hollow secondaries $S_1$, $S_2$ and $S_3$, respectively, may be regulated and controlled in accordance with the conditions desired to be maintained in the furnace by any suitable regulating means, as will be readily apparent to those skilled in the art to which the present invention relates, and which, therefore, need neither be shown nor described in detail herein. By means of such regulating and controlling apparatus, the intensity of the current induced in the secondaries $S_1$, $S_2$ and $S_3$, and thus in the fractions of the material $M_1$, $M_2$ and $M_3$ entering the respective secondaries, may be suitably regulated and controlled to bring about exactly the heat conditions desired for the material in each of the secondaries.

It may here be stated that the greater part of the heat generated in the material will be generated in the lower portion of the material after the same has been preheated and its resistance thus reduced to a point where relatively high currents may be induced therein. On the other hand, very little current will be taken up by the material adjacent its entrance into each hollow secondary due to the fact that it is still at a relatively low temperature which means that its resistance will be relatively high and the current induced in this portion of the mass of the material relatively low. Accordingly, just as the incoming mass of material M is dried by being subjected to a temperature of about 100° C., so the material entering the hollow secondaries is initially preheated to a temperature of about 300° C., after which it is finally but gradually raised to a temperature above about 700° C., generally from about 850 to about 950° C., with the second heating stage, if a second heating stage is desired, whether conducted in the same or in another induction furnace of the same or different type, being, as described, carried on at a temperature of from about 350 to about 450° C. by suitably regulating the current factors of the primaries supplying the secondaries with current by induction.

It may here be stated that the proper voltage, current and frequency factors for the primary and secondary phases of the furnace may be readily determined by trial and experiment, as will be readily apparent to those skilled in the art to which the present invention relates. It may here be stated that the steam jackets 34, which are preferably supplied with hot or even boiling water from another part of the apparatus, serve to conserve heat values and to prevent too high temperatures being generated in the inner walls of the inner tubes 30 of the hollow secondaries.

Communicating with the hollow secondaries but insulated therefrom, as by means of the insulating material 32', are a series, here shown as three, cooling receivers for the treated material, these cooling receivers being generally designated by reference characters $R_1$, $R_2$ and $R_3$ communicating with the hollow secondaries $S_1$, $S_2$ and $S_3$, respectively. Each of the cooling receivers, which is preferably in alignment with its respective hollow secondary and which is likewise hollow, comprises an inner tube 40 provided with the upper and lower flanges 41 and 42, respectively, there being also provided an outer tube 43, likewise flanged, as indicated at 44 and 45, respectively, for cooperation with the respective flanges 41 and 42 of the inner tube 40. There is thus provided a water jacket 46 which serves to receive cooled water, which is raised to almost its boiling temperature, or actually boiling, by the heat absorbed from the treated material within the cooling receivers, and is preferably the water which is sent to the steam jackets 34 of the hollow secondaries where it is generated into steam which is subsequently sent to the steam coils $s_2$ and $s_1$. It may here be further stated that any suitable pumping or equivalent apparatus may be used for providing the necessary pressure for circulating the cooling water in the water jackets 46.

The various water jackets 46 are preferably connected in what may be termed a staggered arrangement. That is, the upper portion of the water jacket 46 of the cooling receiver $R_1$ communicates with the inlet end at the lower end of the steam jacket 31 of the hollow secondary $S_1$. Also, the lower portions of the water jackets 46 of the cooling receivers $R_1$ and $R_2$ are connected by means of a pipe 47, while the upper portions of the water jackets 46 of the cooling receivers $R_2$ and $R_3$ are connected by a pipe 48, the lower portion of the water jacket 46 of the cooling receiver $R_3$ communicating by means of a pipe 49 with a source of supply of cool water.

I prefer that the lower or outer ends of the cooling receivers $R_1$, $R_2$ and $R_3$ shall be under water, whether ordinary water or acidified water. That is, I prefer that the cooling receivers shall be water sealed by having their ends dipped below the water W contained in the vat V. The treated and cooled material dropping down through the cooling receivers $R_1$, $R_2$ and $R_3$ drops onto a conveyor which receives the quenched carbonaceous material and carries it out of the apparatus. Once out of the apparatus, the treated and washed material may be further washed with water or acidulated water and may be otherwise treated by agitation, decantation and filtration, during which latter operation reagents may be forced under pressure through the material as it lies on the filter frames of the filter press or like apparatus in which it is being separated from its suspending fluid. After this the material may be dried and otherwise treated in accordance with the methods of the present invention.

The conveying means, generally designated by reference character C, may consist of a flexible screen of nichrome or other difficultly corrodible wire passing over the guide pulleys 50, 51 and 52 to the drive pulley 53, driven from any suitable source of power not deemed necessary here to be shown, as will readily be apparent to those skilled in the art to which the present invention relates.

At 60, 61 and 62 I have indicated pipes for the admission to the reaction chambers, or any one or more of them, of steam, or of air, or of carbon dioxide, or of any mixture of one or more of these or other activating reagents. The amounts of these reagents thus admitted may be readily regulated and controlled by means of the valves 60', 61' and 62' with which the respective pipes 60, 61 and 62 are provided.

Amplifying the foregoing description of the construction, mode of operation and utility of the aforesaid illustrative embodiment of the apparatus of the present invention, it may be stated that the cooling water entering the water jackets forming parts of the cooling receivers is heated to a boiling point or slightly under, after which it enters the steam jackets embodied in the hollow secondaries, from which the superheated steam thus formed enters the successive steam coils used for the preliminary preheating operation and for the drying operation. The course of the material is from the mouth of the hopper, where it is dried, into the lower portions of the hopper, where it is given a preliminary preheating treatment, after which it enters the respective hollow secondaries where it is finally preheated and, as it continues its downward temperature, its resistance decreasing the while, so that more and more current is induced and thus more and more heat is generated, in the material as it continues its downward course, after which the treated material is cooled and quenched as already stated, being finally removed from the apparatus by the conveyor or equivalent means.

This completes the description of the construction of the aforesaid illustrative embodiment of the apparatus of the present invention. It will be readily apparent that the apparatus is simple in construction, may be readily and conveniently fabricated and assembled, and permits the desired treating operations to be conveniently, expeditiously and accurately carried out with the utmost economy in heat values and the utmost concentration in the space required for such apparatus. In one and the same apparatus the material to be treated may be readily dried, initially preheated, then completely preheated, then subjected gradually to increasing temperatures, until the maximum treating temperature is reached and the heating treatment completed, after which the material may be gradually cooled and finally quenched, after which it may readily be given a final treatment to convert it into a material of maximum efficiency and degree of activation for the desired purpose.

It is to be clearly understood that throughout the specification and claims, wherever the expression "and the like" occurs in connection with the expression "carbonized lignin residues", the expression first designated is intended to include various types and kinds of carbonaceous material which it is desired to treat by generating heat therein by electrical induction for the purpose of improving the quality of such carbonaceous material or of converting the same into some other type of material, unless such a meaning for the expression under consideration is not compatible with the context in which such expression occurs.

Other advantages and superiorities of the apparatus of the present invention, especially as exemplified in the aforesaid illustrative embodiment of the apparatus of the present invention, will be obvious to those skilled in the art to which the present invention relates.

It may here be stated that throughout the claims, wherever the expression "air and steam" appears, this expression is to be construed as covering either air alone, or steam alone, or the mixture of air and steam in any desired proportions.

What I claim as my invention is:

1. Apparatus for activating or revivifying carbonaceous material, such as carbonized lignin residues, which comprises a source of supply of such carbonaceous material, a water-cooled heating chamber in communication with such source of supply of carbonaceous material, and a cooling chamber for cooling material treated, in said heating chamber in communication with the latter.

2. Apparatus for activating or revivifying carbonaceous material, such as carbonized lignin residues, which comprises a source of supply of such carbonaceous material, a heating furnace in communication with such source of supply of carbonaceous material, said heating furnace including a battery of electrical heating chambers, means for feeding carbonaceous material from said source of supply to said heating chamber, a cooling furnace for cooling material treated in said heating furnace in communication with the latter, and means for the passage of treated carbonaceous material from said heating furnace to said cooling chamber.

3. Apparatus for activating or revivifying carbonaceous material, such as carbonized lignin residues, which comprises a source of supply of such carbonaceous material, an electrical heating chamber in communication with such source of supply of carbonaceous material, and a water-cooled cooling chamber for cooling material treated in said heating chamber in communication with the latter, and means for the passage of treated carbonaceous material from said heating chamber to said water-cooled cooling chamber.

4. Apparatus for activating or revivifying carbonaceous material, such as carbonized lignin residues, which comprises a source of supply of such carbonaceous material, a heating furnace, comprising a battery of electrical heating chambers, each including a hollow tubular low-resistance water-cooled secondary of an induction couple having a high-resistance primary, such heating furnace being in communication with such source of supply of carbonaceous material, and a cooling chamber for cooling material treated in said heating furnace in communication with the latter.

5. Apparatus for activatitng or revivifying carbonaceous material, such as carbonized lignin residues, which comprises a source of supply of such carbonaceous material, a heating chamber comprising a hollow tubular low-resistance water-cooled secondary of an induction couple having a high-resistance primary, such heating chamber being in communication with such source of supply of carbonaceous material, means for feeding carbonaceous material from said source of supply to said heating chamber, a cooling chamber for cooling material treated in said heating chamber in communication with the latter, and means for the passage of treated carbonaceous material from said heating chamber to said cooling chamber, said hollow tubular secondary communicating with a steam coil within said source of supply of carbonaceous material for preheating the same.

In testimony, whereof, I have signed my name to this specification this 8th day of June, 1927.

JOHN J. NAUGLE.